| United States Patent [19] | [11] 3,712,433 |
| --- | --- |
| Thut | [45] Jan. 23, 1973 |

[54] DUAL TORQUE COUPLING

[75] Inventor: Paul John Thut, Penfield, N.Y.

[73] Assignee: Burroughs Corp., Detroit, Mich.

[22] Filed: Oct. 7, 1970

[21] Appl. No.: 78,780

[52] U.S. Cl. ...................172/28, 192/33, 192/46, 192/71
[51] Int. Cl. .............................................F16d 11/00
[58] Field of Search....192/28, 46, 71, 105 CD, 56 L, 192/56 R, 54, 33

[56] References Cited

UNITED STATES PATENTS

| 3,212,610 | 10/1965 | Walker et al. | 192/33 R |
| 942,244 | 12/1909 | Boda | 192/71 |
| 3,275,110 | 9/1966 | Lasky | 192/28 |
| 3,463,280 | 8/1969 | Hoffman et al. | 192/46 |

*Primary Examiner*—Benjamin W. Wyche
*Assistant Examiner*—Randall Heald
*Attorney*—Kenneth L. Miller and Edwin W. Uren

[57] ABSTRACT

A torque coupling mechanism having a driving member engageable by engaging means that is pivotally connected to a driven member for rotation of the driven member in one normal direction. An engagement sustaining means maintains the engaging means in engagement with the driving member when the coupling mechanism is subjected to a torque tending to rotate the driven member in an opposite direction from normal rotation.

11 Claims, 6 Drawing Figures

PATENTED JAN 23 1973 3,712,433

INVENTOR.
PAUL J. THUT
BY
Edwin W. Uren
AGENT

DUAL TORQUE COUPLING

BACKGROUND OF THE INVENTION

The invention relates to couplings for positive-engaging clutches and more specifically to engagement sustaining mechanisms for such couplings.

Most positive-engaging clutches of the prior art have at least four elements in common: a coupling which includes a driving member, a driven member engageable for rotation with the driving member, and an engaging member coupled with the driven member for engaging the driving member, and the element that characterizes a clutch, means to engage and disengage the engaging member from the driven member.

Positive-engaging clutches are usually found in high torque applications where the abrupt engaging and disengaging characteristics of such clutches are desirable or at least not prohibitive. In a high pressure printing apparatus, for example, a positive-engaging clutch may be beneficially used to couple a constantly rotating motor to a crank that reciprocally forces print characters against a platen. A clutch in such an application is subjected to a periodic torque load in phase with the reciprocating print characters as they are forced with great pressure against the platen and then released. Pressure against the platen deflects the assembly supporting the various members of the apparatus much like a spring being compressed. When the pressure is released the supporting assembly recoils. Such a reaction upon the release of pressure on the platen applies a momentary reversal in torque loading or countertorque to the clutch, i.e., the driven member and its coupled engaging member are momentarily impelled ahead of the driving member causing the engaging member to overrun by disengaging from the driving member.

In applications such as described where the torque load on a clutch periodically reverses, many of the positive-engaging clutches of the prior art cannot be used. A reversal of torque load, even one of very short duration, would cause the engaging member to override the driving member and to abrasively drag upon its engaging surface thereby causing undue wear and irritating noise.

SUMMARY OF THE INVENTION

It is an object of the coupling mechanism hereinafter described to endure periodic reversals in torque loading while maintaining positive engagement with the driving member.

The present invention accomplishes this and other objects by combining with the three aforementioned elements common to many prior art positive-engaging couplings, an engagement sustaining means that responds to a torque load opposite that of a normal torque load by applying a moment of force to the engaging member to maintain it in engagement with the driving member.

BRIEF DESCRIPTION OF THE DRAWINGS

In order to facilitate a more complete understanding of the invention a preferred embodiment of a clutch mechanism utilizing an inventive coupling will hereinafter be described with reference to the drawings in which.

DESCRIPTION OF THE PREFERRED EMBODIMENT

Figure 1:
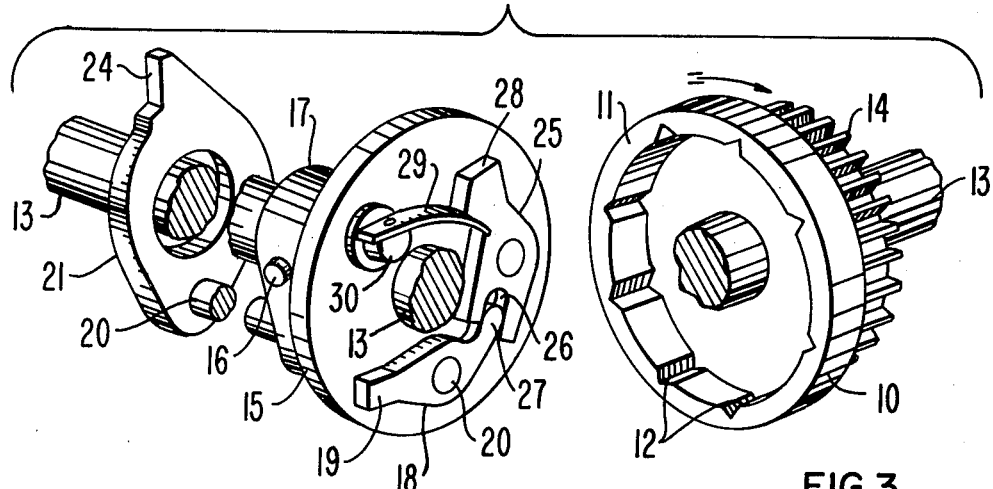
FIG. 1 is an exploded perspective view of the clutch mechanism opened in part.
Figure 2:
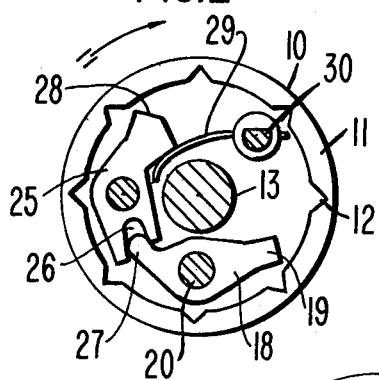
FIG. 2 is a section view showing the pawls of the clutch disengaged.

Referring to the drawings wherein like reference characters designate identical elements in the various Figures, and more particularly to FIG. 1, a driving member 10 having an annular flange 11 with an internally toothed ratchet 12 is loosely mounted on a driven shaft 13. On a portion of the periphery of the driving member is a gear 14 which serves to drivably engage the driving member with a driving means such as a motor. A driven member 15 on the shaft 13 is firmly fastened to the shaft by a pin 16 secured in a pyriform segment 17 of the member and projecting into rigid engagement with a notch in the shaft. The driven member 15 pivotally supports an engaging member or pawl 18 within the cylindrical space formed by the annular flange 11 so that when the pawl 18 pivots in a first or clockwise direction, as shown in FIG. 2, a tooth 19 of the pawl is positioned in engagement with the ratchet 12, as in FIG. 4.

Figure 3:
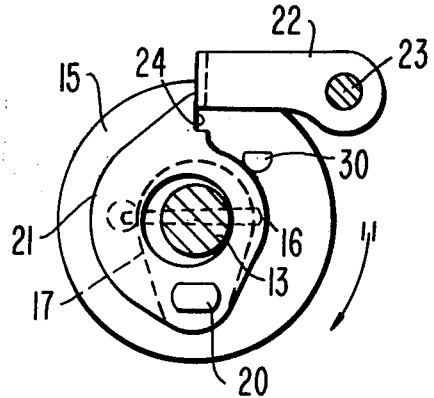
FIG. 3 is an end elevation showing the clutch in a disengaged state.
Figure 5:
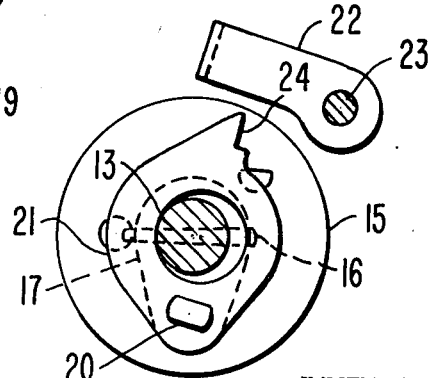
FIG. 5 is an elevation similar to FIG. 3 showing the clutch in an engaged state.

The engaging pawl 18 is securely fastened to one end of a connecting shaft 20 that rigidly joins the engaging pawl 18 with a control member 21 fixedly connected to the other end of the connecting shaft 20. The connecting shaft 20 runs parallel with the driven shaft 13 through a bearing in the driven member 15 thereby permitting the connecting shaft to be freely rotated therein. The driven shaft 13 runs through an opening in the control member that has a substantially larger diameter than the driven shaft thereby allowing the control member to pivot independently of the driven member and of the driven shaft. The opening in the control member 21 is large enough to permit a pivotal motion of the member about the connecting shaft 20, the motion being limited by contact of the surface of the control member forming the opening coming into contact with the driven shaft 13 as shown in FIGS. 3 and 5.

A stop arm 22 is pivotally mounted on a shaft 23 that is spaced apart and independent from the clutch mechanism. The stop arm 22 is pivotal counterclockwise as shown in FIG. 3, for intercepting a step 24 of the control member 21 as it rotates with the engaged driven member 15. When rotated clockwise, as shown in FIG. 5, the stop arm is disengaged from the step 24 of the control member 21 thereby permitting the control member to pivot clockwise carrying with it the engaging pawl 18 into engagement with the toothed ratchet 12 of the driving member 10.

An engagement sustaining means or pawl 25 is pivotally mounted to the driven member 15 on the same surface thereof as the engaging pawl 18. One end of the engagement sustaining pawl 25 has a camming sector in the form of a curvilinear slot 26 that receives a curvilinear cam 27 of the engaging pawl 18. On the other end of the engagement sustaining pawl 25 is an engaging sector or tooth 28 for engagement with the ratchet 12 on the inside periphery of the flange 11.

A biasing means or leaf spring 29, as shown in FIG. 1, is fixedly mounted at one end to a stud 30 projecting from the pawl-mounting surface of the driven member 15. A flat side on the free end of the leaf spring 29 abuts one side of the toothed end of the engagement sustaining pawl 25 to pivotally bias the pawl into engagement with the ratchet 12. The biasing force applied by the leaf spring to the engagement sustaining pawl 25 is transmitted as a moment of force to the engaging pawl 18 that tends to rotate the engaging pawl into engagement with the ratchet.

Figure 6:
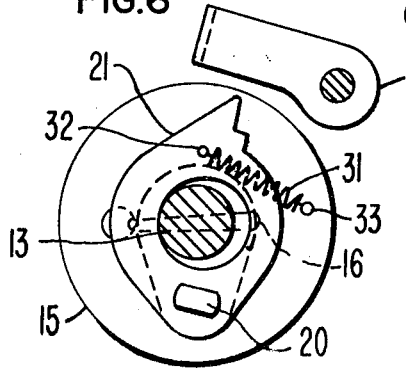

There are other biasing means which can appropriately serve the required function of resiliently biasing the engaging pawl with respect to the driven member 15 into engagement with the ratchet 12. One alternative means is a coiled tension spring 31 joined at one end, as shown in FIG. 6, to an aperture 32 in the control member 21 and at the other end to a rod 33 projecting from and affixed to the driven member 15.

The engagement sustaining pawl 25 is pivotally mounted on the driven member 15 so that when the driven member is subjected to a reversal in torque loading and moves clockwise with respect to the driving member 10 the ratchet 12 of the latter applies a counterclockwise moment to the engagement sustaining pawl thereby forcing the tooth 19 of the engaging pawl into the ratchet 12 thus preventing the tooth from overrunning the driving member and dragging over the ratchet surface.

Figure 4:
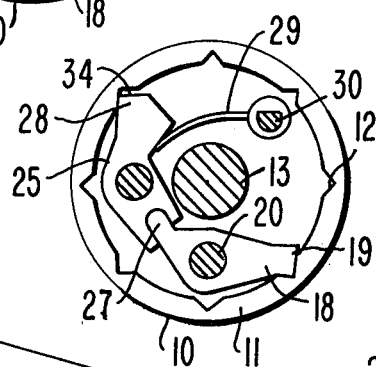
FIG. 4 is a section view similar to FIG. 2 showing the pawls of the clutch engaged.

An important feature of the clutch and coupling as shown, is that the driven member 15 is permitted a small amount of clockwise displacement or overrun with respect to the driving member 10, so that high stresses characteristic of absolute rigidity are avoided. To accomplish this objective the engagement sustaining pawl 25 is slightly shortened, so that a narrow gap 34 is created between the engaged notch of the ratchet and one face of the tooth of the sustaining pawl, as shown in FIG. 4. The width of this gap 34 determines the amount of clockwise overrun that the driven member 15 is allowed with respect to the driving member 10. The gap 34 may be adjusted to achieve minimum stress under a torque reversal situation such as described above.

OPERATION

As heretofore described, when the stop arm 22 intercepts the step 24 of the control member 21 the engaging pawl 18 is pivoted out of engagement with the ratchet 12 of the driving member 10. As illustrated in FIG. 3, the engaged stop arm 22 pivots the control member 21 and the connecting shaft 20 to a limit defined by the contact of the inner surface of the control member opening against the driven shaft 13. This pivoting action of the control member 21 is transmitted via the connecting shaft 20 to the engaging pawl 18 thereby rotating the engaging pawl counterclockwise out of engagement with the ratchet 12 of the driven member 10. When the engaging pawl 18 rotates counterclockwise, its curvilinear cam 27 coupled to the curvilinear slot 26 of the engagement sustaining pawl 25 cams the engagement sustaining pawl clockwise against the biasing force of the biasing means 29 or 31 and out of engagement with the ratchet 12 of the driving member 10. There is a slight clockwise torsional force applied to the driven shaft 13 and consequently to the affixed driven member 15 by the friction between the rotating driving member 10 and the stationary driven shaft. This slight force serves to hold the step 24 of the control member 21 in abutment with the stop arm 22 thereby maintaining the clutch mechanism in a disengaged state.

When the stop arm 22 is rotated clockwise, the control member 21 and the shaft 20 are freed to rotate clockwise, impelled by the biasing means 29 or 31. The engagement sustaining pawl 25 and the engaging pawl 18 are accordingly pivoted into engagement with the clockwise rotating ratchet 12. The driven member 15, the control member 21 and the driven shaft 13 then effectively connected or engaged with the driving member 10.

The role that the engagement sustaining pawl 25 plays in the operation of the coupling mechanism can readily be perceived when considering the driven shaft 13 being subjected to periodic reverse or clockwise torsional force or loads. In describing the operation of the coupling so far it has been assumed that the driving member 10 is driven constantly clockwise and that the driven member 15 and the shaft 13 always maintain a counterclockwise torsional loading. When the driven member 15 or shaft 13 of the clutch is subjected to a clockwise torsional load, as was described earlier in connection with printing apparatus, or when the driving member 10 is abruptly stopped without a corresponding braking action applied to the driven shaft 13, the ratchet 12 of the driving member tends to force the tooth 19 of the engaging pawl 18 out of engagement therewith by pivoting the pawl counterclockwise. The engaging pawl 18, standing alone, can only engage the ratchet 12 when there is a normal counterclockwise torsional load applied to the coupling.

When a reverse or clockwise torsional load is applied to the driven member 15, it begins to override the driving member thereby pivoting the engaging pawl 18 in a second or counterclockwise direction out of engagement with the driving member 10.

The engagement sustaining pawl 25 is thus cammed clockwise until the tooth face of the pawl forming the gap 34 with the ratchet abuts therewith. So positioned, the restraining force of the ratchet 12 against the tooth 28 of the engagement sustaining pawl 25 counteracts the tendency of the engaging pawl 18 to rotate counterclockwise out of engagement with the ratchet.

When a clutch having a coupling such as described above is used in the printing apparatus of the aforementioned example, the advantageous results of the present invention can be readily understood. During the section of the rotational cycle in which the printed characters move away from the platen, the deflection within the supporting assembly recoils thereby applying a reverse or clockwise torsional loading to the driven member 15 of the coupling mechanism. The engagement sustaining pawl 25 permits the driven member to overrun the driving member for the width of the gap 34 then it applies a clockwise moment of force to the engaging pawl 18 that prevents the driven member from rotating clockwise with respect to the driving member and abrasively dragging the tooth 19 of the engaging pawl over the ratcheted surface of the inner periphery of the driving member flange 11.

It will be apparent that many alterations and modifications can be made to the structure of the preferred embodiment of the coupling as herein described, without truly changing the inventive concept residing therein.

What is claimed is:

1. An improved torque coupling including:
   a driving member connectable to a driving means for imparting axial rotation to said driving member,
   a driven member coaxially disposed with respect to said driving member, and
   engaging means connected to said driven member, said means biased in driven engagement with said driving member for transmitting a unidirectional torsional load to said driving member, wherein the improvement comprises:
   engagement sustaining means cammably coupled with said engaging means, whereby in response to a torsional load opposite said unidirectional load said sustaining means maintains said engaging means in engagement with said driving member, and
   control means rigidly connected to said engaging means whereby said engaging means is pivoted into and out of engagement with said driving member in the process of coupling and uncoupling said driven member with and from said driving member.

2. In a torque coupling having a driving member with a ratchet circularly disposed thereon, said member being axially rotatable by a motor or the like, a driven member disposed coaxially with said driving member and an engaging pawl pivotally mounted on said driven member in biased engagement with the ratchet on said driving member for rotatably coupling said driven member with said driving member under a unidirectional torsional load on the coupling, an improvement comprising:
   control means rigidly connected to said engaging pawl whereby said engaging pawl is pivoted into and out of engagement with said driving member in the process of coupling and uncoupling said driven member with and from said driving member, and
   an engagement sustaining pawl pivotally mounted on said driven member and cammably coupled with said engaging pawl, said sustaining pawl being operative to force said engaging pawl into engagement with said ratchet in response to a torsional load opposite said unidirectional load.

3. A coupling as defined in claim 2 wherein said engagement sustaining pawl has a tooth biased into engageable contact with the ratchet on said driving member and wherein said cammable coupling of said engagement sustaining pawl and said engaging pawl includes a camming surface of said engagement sustaining pawl, said biased tooth and said camming surface being responsive to a relative torsional load between said driving and said driven members opposite said unidirectional load and effective for imparting a predetermined engagement sustaining force to said engaging pawl to thereby maintain said engaging pawl in firm engagement with said ratchet.

4. In a torque coupling including a driving member engageable for axial rotation by a motor or the like and a driven member disposed coaxially with said driving member, an improved means for rotatably coupling said driven member with said driving member comprising:
   an engaging pawl pivotally mounted on one of said members, said pawl having an engaging portion resiliently biased in a first pivotal direction into engagement with the other of said members,
   control means rigidly connected to said engaging pawl whereby a first moment of force between said pawl and said other member tends to pivot said pawl in said first pivotal direction for rotatably coupling the two said members, and
   an engagement sustaining pawl pivotally mounted with said engaging pawl on said one member, said sustaining pawl having an engaging sector resiliently biased into engagement with said other member and having also a camming sector resiliently biased in abutment with said engaging pawl, said sustaining pawl being operative upon a second moment of force opposite said first moment of force to cam said engaging pawl in said first pivotal direction and into engagement with said other member.

5. A torque coupling as defined in claim 4 further including a biasing means connected to said one member for resiliently biasing said engagement sustaining pawl and said engaging pawl into engagement with said other member.

6. A dual torque coupling comprising:
   a driving member engageable for axial rotation by a motor or the like, said driving member comprising a ratchet including a plurality of notches,
   a driven member disposed coaxially with said driving member,
   engaging means pivotally mounted on said driven member, said means being pivotal in a first direction into engagement with said driving member and in a second direction out of engagement therewith,
   engagement sustaining means pivotally mounted on said driven member and cammably coupled with said engaging means, said sustaining means being separately engageable with said driving member,
   control means rigidly connected to said engaging means and effective for pivoting said engaging means in said first and second directions, and
   means resiliently biasing said engagement sustaining means, said engaging means, and said control means such that said engaging means is biased in said first pivotal direction, said biased sustaining means in cooperation with said engaging means being non-responsive to a normal torsional load upon said driven member but responsive to a counter torsional load thereupon to apply a torque to said engaging means in said first pivotal direction to thereby force said engaging means into firm engagement with said driving means.

7. A coupling as defined in claim 6 wherein said cammable coupling of said engagement sustaining means with said engaging means is accomplished by an interconnecting camming sector, and wherein the bias of said biasing means is applied to said engagement sustaining means and transmitted to said engaging means through said interconnecting camming sector, to thereby bias said engaging means in said first pivotal direction.

8. A coupling as defined in claim 7 wherein said engagement sustaining means is rendered separately engageable with said driving member by means of a tooth thereof, said tooth being disposed opposite the pivot point of said sustaining means from said interconnecting camming sector.

9. A coupling as defined in claim 8 wherein one face of said tooth of said engagement sustaining means is spaced apart from the corresponding face of a notch of said ratchet engaged thereby, said spacing forming a gap defining the amount of overrun that is permitted the driven member with respect to the driving member while under the influence of counter-torque loading on the coupling.

10. A coupling as defined in claim 9 wherein said interconnecting camming sector of said engaging means and said engagement sustaining means is effective to cam said sustaining means out of engagement with said driving member when said engaging means is pivoted in said second direction by said control member.

11. A coupling as defined in claim 9 wherein said biasing means resiliently biases said control member in said first pivotal direction with respect to said driven member for in turn resiliently biasing said engaging means into engagement with said driving member.

* * * * *